Dec. 3, 1929.                P. HARKER                1,738,051
                         AUTOMATIC CHECK GATE
                          Filed May 18, 1927
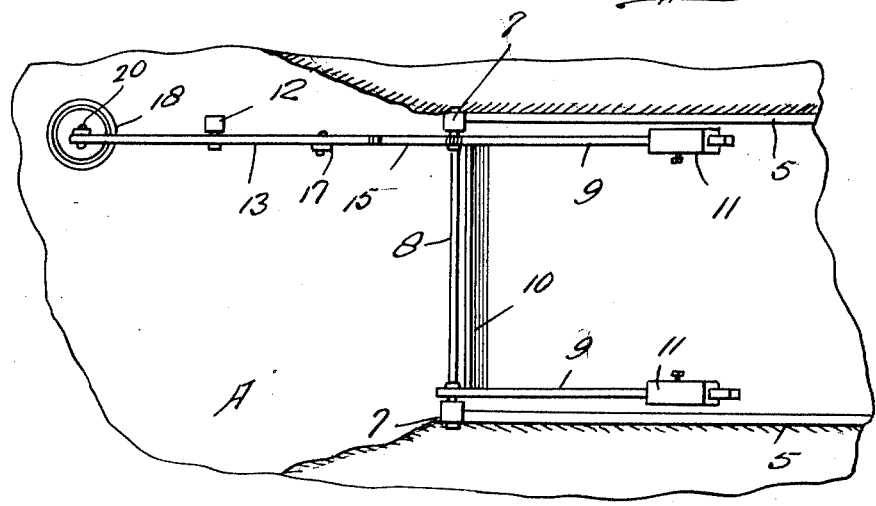
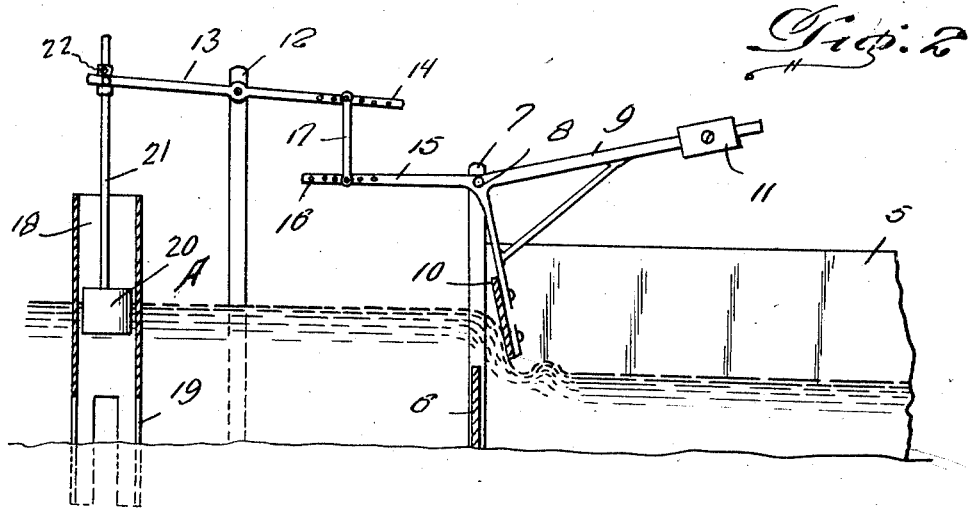
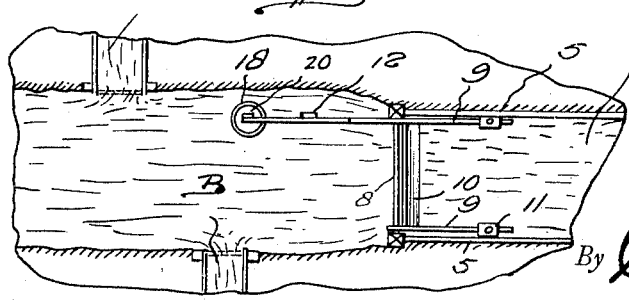
Inventor
Parley Harker,
By Clarence A. O'Brien
Attorney Patented Dec. 3, 1929

1,738,051

UNITED STATES PATENT OFFICE

PARLEY HARKER, OF LEWISVILLE, IDAHO

AUTOMATIC CHECK GATE

Application filed May 18, 1927. Serial No. 192,314.

This invention relates to automatic check gates for use in irrigation systems so as to automatically control the pressure or level of the water in a main irrigating ditch, canal, or the like, and from which lead sub-ditches or canals usually termed laterals. By reason of the present invention the pressure or level of the water within the main irrigation ditch or canal may be maintained constant, the gate being automatically moved to open and closed position by the tendency of the water within the main ditch or canal to change its level and consequent pressure.

In other words, the device is of such construction that the gate will be maintained partially open during the normal level of the water within the main ditch or canal, whereas any tendency of the level of the water in said main ditch or canal to rise will cause the opening of the gate so that the rising or added pressure will be compensated for by reason of a greater amount of water passing beyond a point in the canal from which the laterals lead.

By reason of the provision of a check gate of this character, there will be little or no liability of the water within the main ditch or canal overflowing its banks, when a freshet of water happens to come down the river, and enter the ditch or canal. Likewise, the level and pressure of the water in the laterals will be maintained constant.

An added feature of this automatic check gate is to enable a predetermined level or pressure of the water to be maintained within that area of the main ditch or canal from which the laterals are fed.

In the drawings, wherein like reference characters indicate corresponding parts throughout the views:

Figure 1 is a top plan view of an automatic check gate construction as installed within a main irrigating ditch or canal and at a point beyond the laterals that lead therefrom, for the purpose of maintaining the pressure and level of the water in back of the gate relatively constant.

Fig. 2 is a detail longitudinal section thereof, and

Fig. 3 is a somewhat diagrammatic top plan disclosing the gate as installed within the canal beyond the point from which the laterals are led, this view disclosing laterals at the opposite banks of said ditch.

Now having particular reference to the drawing, A designates the main ditch or canal of an irrigation system, from the opposite sides of which extend a plurality of sub-ditches or canals usually designated a lateral, those disclosed in Fig. 3 being indicated by the reference characters B. The side walls of the main canal A, at a point beyond the laterals B are preferably built up for a slight distance by walls 5—5, while arranged between said walls at the forward ends thereof and at the bottom of the ditch or canal, is the usual sill board 6 of a predetermined height, the said side walls 5—5 at opposite ends of the sill being supported by vertical posts 7—7.

In carrying out the present invention, a cross bar 8 is arranged between the upper ends of the posts 7—7 while attached thereto directly inwardly of these posts are L-shaped arms 9—9, arranged across the ends of the depending portions of which is a water gate 10. Adjustably arranged upon the rearwardly extending portions of these arms 9—9 are counterbalancing weights 11—11 that serve to normally maintain the water gate 10 in closed position that will prevent the opening of the gate beyond a predetermined position when set to counteract a particular pressure or level of the water within the main ditch or canal A.

Arranged within the main ditch or canal A outwardly of the side walls 5—5 is a vertical post 12, to which is pivoted the center of a lever 13, the end of the same adjacent the gate being formed with a plurality of longitudinally spaced openings 14, (see Fig. 2). The adjacent L-shaped gate supporting arm 9 is formed with an outwardly extending lever 15, terminating beneath the lever 13 and being also provided with a plurality of spaced openings 16, the openings in these levers being for the purpose of permitting their adjustable interconnection by reason of a link 17 pivoted at its ends to the levers as clearly disclosed.

Also arranged within the canal A at the outer side of the post 12 is a hollow vertical post 18, that in reality affords a float cylinder, the lower end thereof being longitudinally slotted as at 19, to permit the water to enter therein. Arranged within this cylindrical post 18 is a float 20, arranged upon the lower end of a vertically extending stem 21, which stem is adjustably connected to the adjacent end of the lever 13, as at 22, so that the stem may be adjustably secured to the lever with the end in view that the float 20 may be set to perform its function at variations of a particular fluid level, within the ditch or canal A, in front of the spill-boards. By reason of the adjustable association of the float stem 21 with the lever 13 and the adjustable interconnection of the levers 14 and 15, and the adjustable weights 11—11 upon the gate arms 9, the device may be set, so that the gate 10 will be moved to a partially or fully open or closed position, whenever there is a tendency of the water within the ditch or canal to raise or lower above or below a predetermined level or pressure against the gate 10 for obviously maintaining the level of the water within the ditch or canal A, in front of the gate as well as the water within the laterals B substantially constant.

The specific operation as well as the construction of this automatic check gate will be completely understood by those skilled in this art, after carefully considering the foregoing specification in accompaniment with the present drawing, and even though I have herein shown and described the invention as consisting of certain detailed structural elements, it is nevertheless to be understood that some changes may be made therein without affecting the spirit and scope of the appended claim.

Having thus described my invention, what I claim as new is:—

In an automatic check gate for canals, a rockable shaft supported horizontally across the upper portion of the canal, a pair of substantially L-shaped members secured on the end portions of the shaft, a gate extending across the depending arms of said L-shaped members, a counter balancing weight slidably adjustable on the outer end of the laterally extending arm of each L-shaped member to maintain the gate normally in a closed position, a lever extending forwardly from the lateral arm of one of the L-shaped members, a cross arm pivotally supported intermediate its ends on a support, forwardly of the rockable shaft, a link operatively connecting the forward end of the lever with the rear end of the cross arm, and a float operatively connected with the forward end of the cross arm for actuating the shaft to swing the gate to an open position when the water rises to a predetermined level.

In testimony whereof I affix my signature.

PARLEY HARKER.